(12) United States Patent
Xie et al.

(10) Patent No.: US 11,797,731 B2
(45) Date of Patent: Oct. 24, 2023

(54) SYSTEMS AND METHODS FOR SIMULATING PRINTED CIRCUIT BOARD COMPONENTS

(71) Applicant: ANSYS, INC., Canonsburg, PA (US)

(72) Inventors: Wenjie Xie, Bridgeville, PA (US); Jin Wang, Venetia, PA (US); Grama Ramaswamy Bhashyam, Bethel Park, PA (US); Tim Paul Pawlak, McMurray, PA (US)

(73) Assignee: ANSYS, INC., Canonsburg, PA (US)

( * ) Notice: Subject to any disclaimer, the term of this patent is extended or adjusted under 35 U.S.C. 154(b) by 142 days.

(21) Appl. No.: 17/018,860

(22) Filed: Sep. 11, 2020

(65) Prior Publication Data

US 2021/0209272 A1     Jul. 8, 2021

Related U.S. Application Data

(60) Provisional application No. 62/958,388, filed on Jan. 8, 2020.

(51) Int. Cl.
  *G06F 30/23*     (2020.01)
  *G06F 30/398*   (2020.01)

(52) U.S. Cl.
  CPC .......... *G06F 30/23* (2020.01); *G06F 30/398* (2020.01)

(58) Field of Classification Search
  CPC .... G06F 30/23; G06F 30/398; G06F 2115/12; G06F 30/39
  USPC .......................................... 703/13; 716/137
  See application file for complete search history.

(56) References Cited

U.S. PATENT DOCUMENTS

| | | | | |
|---|---|---|---|---|
| 8,290,753 | B2 * | 10/2012 | Tryon, III | G06F 11/008 703/2 |
| 9,715,571 | B1 * | 7/2017 | Rath | G06F 30/398 |
| 2009/0030660 | A1 * | 1/2009 | Celik | G06T 19/00 703/2 |

FOREIGN PATENT DOCUMENTS

| | | | | |
|---|---|---|---|---|
| JP | 2005115859 | * | 10/2003 | G06F 17/50 |
| WO | 2017001890 | * | 6/2015 | H05K 3/00 |
| WO | WO2018031186 | * | 2/2018 | H05K 3/00 |

OTHER PUBLICATIONS

Dogruoz and Nagulapally, "Effects of trace layers and joule heating on the temperature distribution of printed circuit boards: a computational study", 2009, Journal of Thermal Science and Engineering Applications 1.2, pp. 1-10.*

* cited by examiner

*Primary Examiner* — Juan C Ochoa
(74) *Attorney, Agent, or Firm* — Womble Bond Dickinson (US) LLP (57) ABSTRACT

Systems and methods for simulating a circuit board design include receiving a printed circuit board design comprising an electronic component and a dielectric board, generating a first finite element model of the dielectric board independent of the electronic component, and generating a second finite element model for the electronic component. The method further includes combining the first finite element model with the second finite element model to obtain a final finite element model for the printed circuit board design.

20 Claims, 9 Drawing Sheets

SYSTEMS AND METHODS FOR SIMULATING PRINTED CIRCUIT BOARD COMPONENTS

CROSS REFERENCE TO RELATED APPLICATIONS

This application claims priority to U.S. Provisional Patent Application No. 62/958,388, entitled "SYSTEMS AND METHODS FOR SIMULATING PCB TRACES/VIAS," filed Jan. 8, 2020, which is herein incorporated by reference in its entirety.

FIELD OF THE INVENTION

The present disclosure relates generally to modeling electronic circuits and, more specifically, to simulating printed circuit board components.

BACKGROUND

Designers and manufacturers are increasingly using computer aided design (CAD) systems, such as computers that execute simulation software, to design products such as automobiles, airplanes, turbine engines, heating and cooling systems, etc. The use of such CAD systems allows the designers and manufacturers to test out different designs using the software without requiring that the design be built. For example, thermo-mechanical fatigue testing or thermal analysis of a proposed product, based on a design, can be performed on a simulated design of the product before the product is fabricated to determine when and how the product will fail. Similarly, a design of an airplane's wing, or other part, can be tested in the CAD system before the wing is fabricated to determine how well the wing will behave based on, for example, aerodynamics of the wing while in flight. This testing by simulation can allow a designer to consider different possible designs and reject some of them based on the results of the simulation before the product is even fabricated. Moreover, results of one or more simulations can cause a designer to revise the design to improve its behavior or performance.

Such simulations often use computational meshes that are generated over the simulated physical space of a physical object that is being simulated in the simulation. For example, finite element methods that are used in physics based simulations of a physical object typically require the generation of a mesh throughout the space of the simulated physical object. A mesh includes elements that are typically of simple shapes such as tetrahedrons, hexahedrons, prisms, and other volumetric (three dimensional—3D) shapes. These simple shapes have faces, edges, and vertices. A mesh includes a collection of these elements, which can be referred to as mesh elements, and a mathematical description of the relationship between the nodes, edges, and faces of the mesh elements. In a numerical analysis of physical systems, complicated three-dimensional shapes may be broken down to (i.e., approximated by) a mesh representation. The mesh representation may subsequently be used in setting up and solving equations for analysis using a discretization method (e.g. finite element analysis) which may include numerical solution of partial differential equations based on boundary conditions.

Excessive thermal stresses in printed circuit boards (PCBs) and electronic chips may lead to catastrophic failures. Thermal and thermal stress simulations are often adopted in the design process of PCB and chip design to assess performance under various operating conditions. Embedded components are relatively small compared to the overall dimensions of the PCB, generally exhibit irregular patterns, and are present in large quantities. Therefore, in order to obtain accurate simulation results, component details should not be ignored or homogenized. However, modeling and simulation of a PCB with traditional methods is very time consuming and potentially prohibitive in terms of computational resources.

SUMMARY OF THE DESCRIPTION

A modeling and simulation procedure generates a finite element model for a PCB design. A PCB design may include electrical components (e.g., vias, traces, wires, and devices) embedded within a dielectric board. The simulation procedure independently models the dielectric board and the PCB components embedded within the dielectric board. The independent models are then combined according to the PCB design. To combine the models, the modeling and simulation procedure may modify the model of the dielectric board to include special purpose finite elements (referred to herein as component finite elements) corresponding to contact locations of embedded components. The independent component model may represent the geometry, locations, material properties, and other physical properties of the PCB components. The physical properties associated with PCB component model may then be mapped to the component finite elements embedded in the model of dielectric board. Thus, the procedure significantly reduces engineering time and computational model size by reducing the complexity of the meshed model while at the same time ensuring adequate simulation accuracy by considering all PCB components separately.

In one embodiment, a method described herein can include the following operations: receiving a printed circuit board design comprising an electronic component and a dielectric board; generating a first finite element model of the dielectric board independent of the electronic component; generating a second finite element model for the electronic component; and combining, the first finite element model with the second finite element model to obtain a final finite element model for the printed circuit board design.

In one embodiment, combining the first finite element model with the second finite element model includes generating one or more component finite elements embedded in the first finite element model; and mapping the second finite element model to the component finite elements embedded in the first finite element model. In one embodiment, generating one or more component finite elements embedded in the first finite element model includes determining, based on the printed circuit board design, a collision of the second finite element model and the finite elements of the first finite element model of the dielectric board. In one embodiment, the second finite element model comprises a first set of physical properties associated with the electronic components. In one embodiment, a second set of physical properties is associated with each of the finite elements of the first finite element model of the dielectric board. In one embodiment, the first set and the second set of physical properties comprise one or more non-linear properties of a corresponding finite element.

In one embodiment the method further includes simulating, based on the final finite element model, operation of the printed circuit board design; and identifying, based on the simulation, thermal stresses associated with operation of the printed circuit board design. In one embodiment, a global identifier is associated with the second finite element model. In one embodiment, the first finite element model is generated based on a geometry of the dielectric board. In one embodiment, the second finite element model of the electronic component comprises a one-dimensional or two-dimensional representation of the electronic component.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in nonvolatile memory, such as flash memory, or dynamic random access memory (DRAM) which is volatile or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The methods and embodiments described herein can be used in the context of multi-physics simulation systems (such as a data processing system that executes simulation software from Ansys Inc of Canonsburg, Pa.) that can be used to design a product and design how the product can be fabricated or manufactured. Furthermore, the methods and embodiments described herein can be used in an iterative design process in which an initial design of a product is generated followed by simulation of the design. The initial design may then be revised based on the simulated result prior to fabrication or manufacturing of the product (e.g., prior to mass manufacture of the product). Therefore, the expense of redesign can be significantly reduced using the methods and embodiments of the present disclosure.

Figure 1:
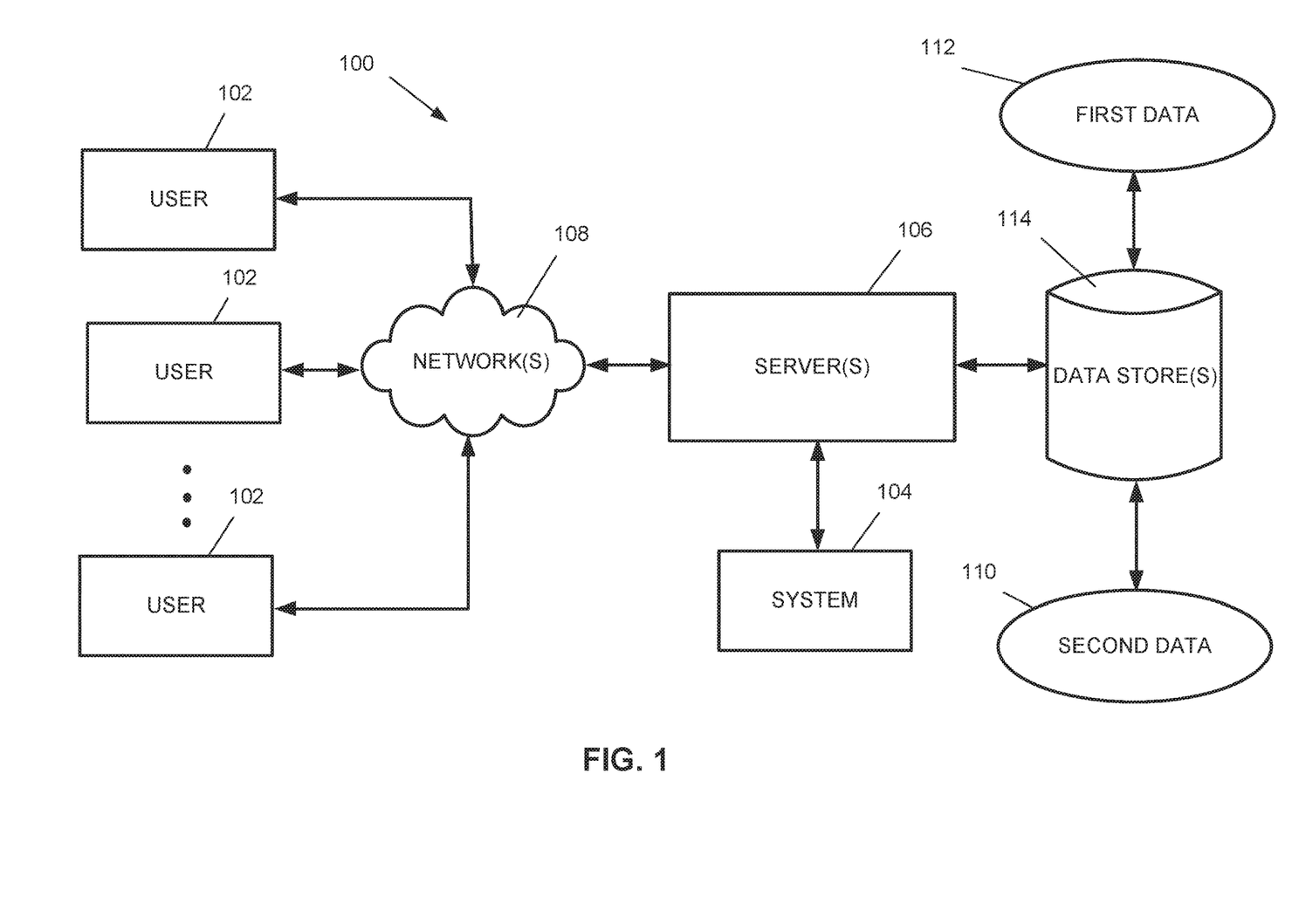
FIG. 1 is a block diagram illustrating a networked system according to one embodiment.

FIG. 1 depicts at 100 a computer-implemented environment wherein users 102 can interact with a system 104 hosted on one or more servers 106 through a network 108. The system 104 contains software operations or routines. The users 102 can interact with the system 104 in a number of ways, such as over one or more networks 108. One or more servers 106 accessible through the network(s) 108 can host system 104. Servers 106 and system 104 may store data (e.g., first data 112 and second data 110) in one or more data stores 114 coupled to the one or more server 106. It should be understood that the system 104 could also be provided on a stand-alone computer for access by a user. Note the system 104 can also be accessed through an application programmable interface (API). Inputs to the system 104 may include structural designs, such as a printed circuit board design, to be modeled and simulated under one or more operating conditions.

Figure 2A:
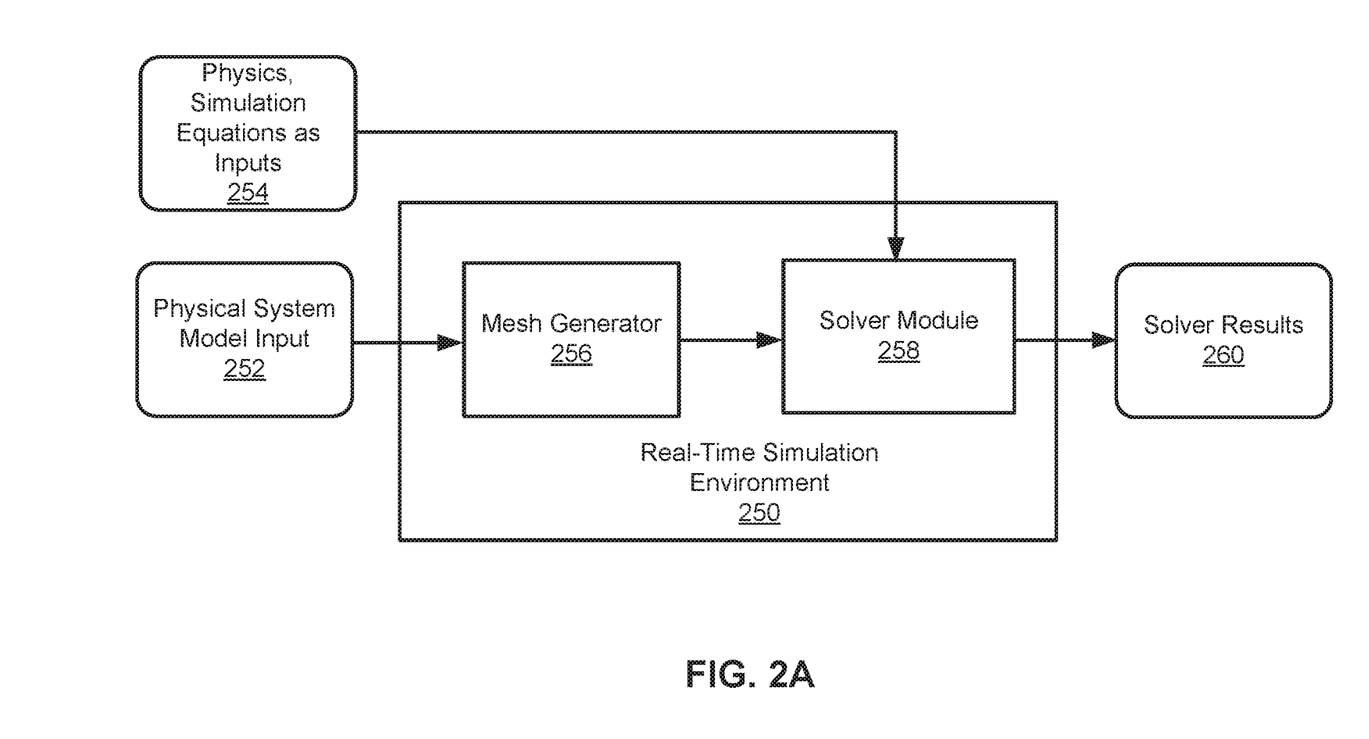
FIG. 2A is a block diagram illustrating an example of a real-time simulation environment according to one embodiment.

FIG. 2A is a block diagram illustrating an example of a real-time simulation environment according to one embodiment. Real-time simulation environment can simulate a 1D, 2D, or 3D physical systems for different characteristics, such as structural, fluid dynamics, electromagnetics, aerodynamics, etc., for the physical system. Referring to FIG. 2A, simulation environment 250 includes a mesh generator 256 and solver module 258. Mesh generator 256 can take a physical system model input 252, specify a size (e.g., a length of an edge of individual mesh elements), and generate a mesh model to represent the physical system. Solver module 258 can be any type of solver, such as a finite element solver, having a mesh-size independent stopping criterion. Solver module 258 can solve for a potential solution based on a set of equations, or physics 254, and a mesh model from mesh generator 256 generating solver results 260. Here the set of equations describe one or more characteristics being simulated. In one embodiment, the solver results 260 can be displayed in a user interface and a user can reconfigure the model or any other inputs in real-time based on the simulation feedbacks. Thus, simulation results can be reflected in real-time based on the reconfigurations.

In one embodiment, physical system model input 252 may include a printed circuit board design with a dielectric board and one or more electronic components embedded in the dielectric board. In one embodiment, mesh generator 256 may generate an independent mesh of finite elements for the dielectric board and an independent mesh for each of the embedded electronic components of the printed circuit board design. The independent mesh for the dielectric board and the independent mesh of the embedded electronic components can then be combined, as discussed in more detail below. The mesh generator 256 may update the mesh with physical properties and the solver module 258 may use the physical properties and the physics simulation equations 254 to generate the solver results 260. The solver results 260 may include stressors and other physical conditions of the physical system model input under various operating conditions.

Figure 2B:
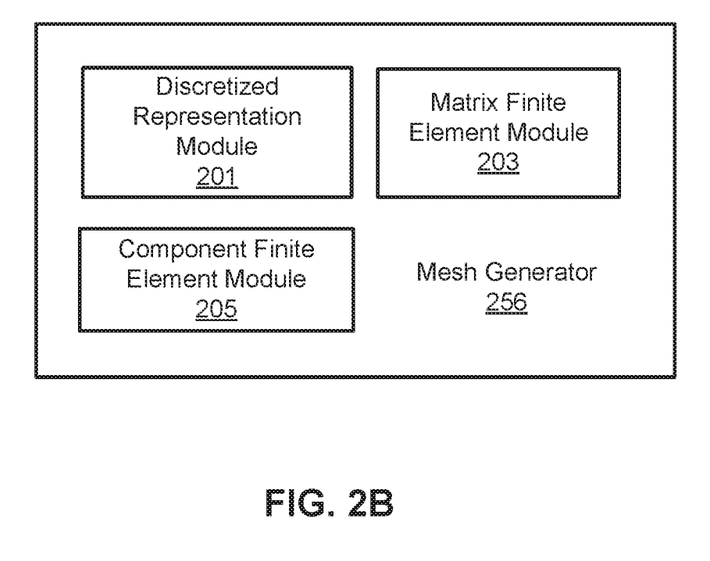
FIG. 2B is a block diagram illustrating an example of mesh generator according to one embodiment.

FIG. 2B is a block diagram illustrating an example of a mesh generator according to one embodiment. Referring to FIG. 2B, mesh generator 256 includes discretized representation module 201, matrix finite element module 203, and component finite element module 205. Discretized representation module 201 may generate discretized representations of each of the embedded components in the PCB design. The discretized representation module 201 may then update each of the discretized representations with material properties and loads associated with the embedded components. For example, the discretized representation module 201 may generate discrete representations for vias, traces, wires, and any other electronic device or component included in the PCB design.

Matrix finite element module 203 may mesh the dielectric board of the PCB design into a matrix of finite elements independently of or separately from the embedded components. For example, the matrix of finite elements may be meshed to represent the dielectric board without regard to the embedded components. Thus, the matrix finite element module 203 may mesh the dielectric board based on the geometry of the board alone without the embedded components. The mesh and model complexity is greatly reduced for meshing the dielectric board since it is meshed without regard to the components embedded in the dielectric board.

Component finite element module 205 may generate finite elements for the components using the discretized representations and the associated properties. In one embodiment, the finite elements for the components may be generated to represent the embedded components of the PCB design separately from or independently of the dielectric board of the PCB design. The component finite element module 205 may map each discrete representation to a special purpose finite element (referred to herein as a component finite element) and embed the component finite elements in the matrix of finite elements representing the dielectric board. For example, the component finite element module 205 may identify collisions (i.e., physical contact or connection) and/or interactions (e.g., thermal interactions, mechanical interactions, etc.) between surfaces of the embedded components and the dielectric board based on the PCB design. Based on the collisions and interactions, the component finite element module 205 may divide the discretized representations into smaller geometric domains so that each of the domains corresponds directly to a finite element of the matrix of finite elements (e.g., is enclosed within the corresponding finite elements). The component finite element module 205 may then perform local discretization with these smaller component domains to generate embedded component finite elements in the model of the dielectric board (i.e., the matrix of finite elements) and map the properties of the discretized representations to the corresponding embedded component finite elements.

Figure 3:
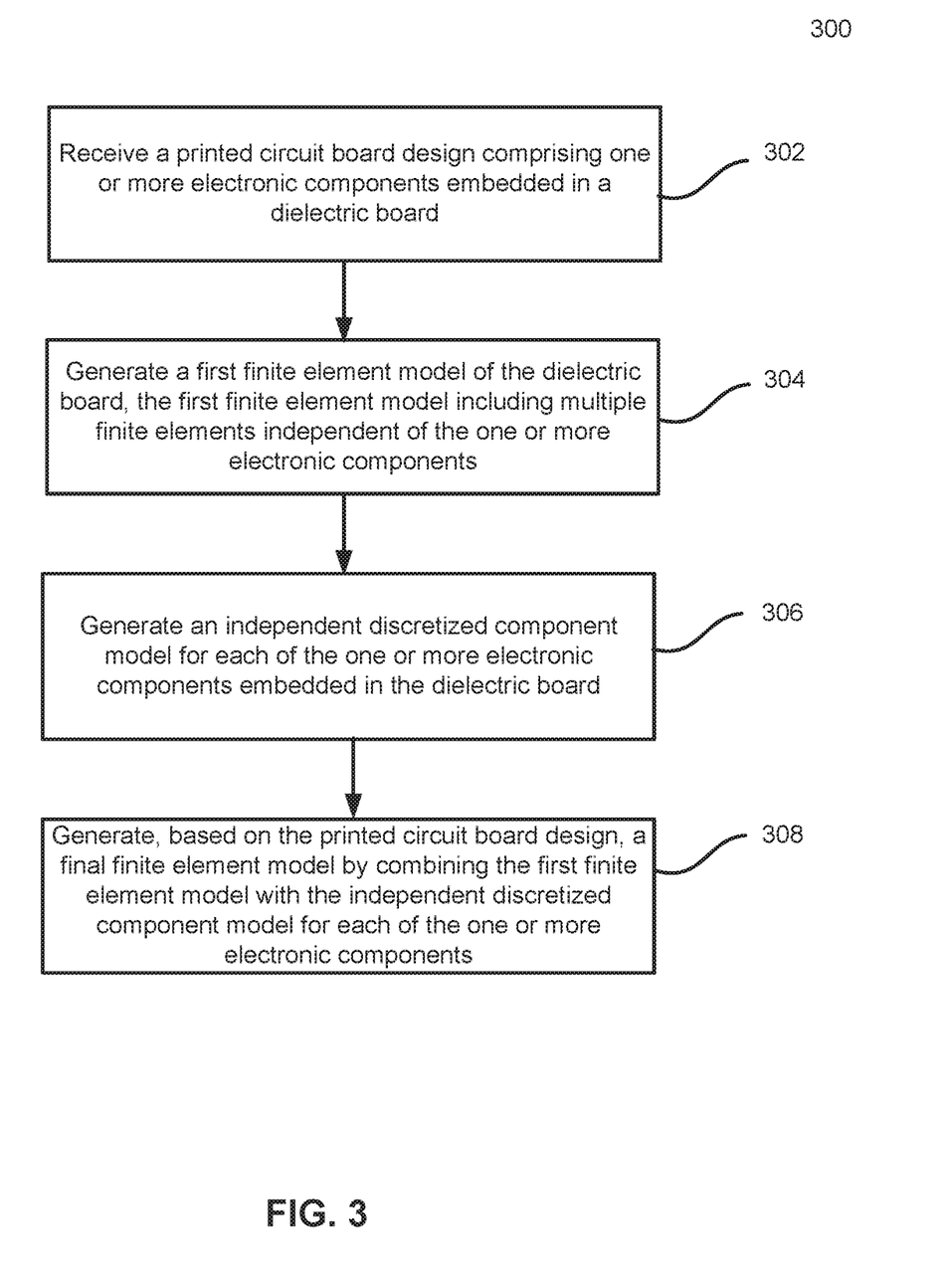
FIG. 3 depicts a flow diagram illustrating an example method for generating a model of a printed circuit board according to one embodiment.

FIG. 3 depicts a flow diagram illustrating an example method for generating a model of a printed circuit board according to one embodiment. Process 300 may be performed by processing logic which may include software, hardware, or a combination thereof. For example, process 300 can be performed by mesh generator 256 of FIGS. 2A-2B. Referring to FIG. 3, at block 302, processing logic receives a printed circuit board design, the printed circuit board including one or more electronic components embedded in a dielectric board.

At block 304, the processing logic generates a first finite element model of the dielectric board, the first finite element model including multiple finite elements and one or more physical properties associated with each of the finite elements independent of the one or more electronic components. The processing logic may associate one or more physical properties with each of the finite elements of the first finite element model of the dielectric board. The one or more physical properties may include one or more linear or non-linear properties of a corresponding finite element. Linear properties may be properties that change linearly with respect to a variable of the system (e.g., if temperature predictably rises in direct relation with power used by a component). Non-linear properties may be properties that may be field dependent and may behave differently under differing conditions. For example, a non-linear property behavior may depend on previous use of a component. In one example, non-linear properties may be provided by constitutive relationships indicating the relationship between physical quantities of a material of the board or the components. In one embodiment, the processing logic may generate the first finite element model based on a geometry of the dielectric board.

At block 306, the processing logic generates an independent discretized component model for each of the one or more electronic components embedded in the dielectric board. The independent discretized component model may be a finite element model for each of the electronic components. Each independent discretized component model may include one or more physical properties associated with a corresponding electronic component of the one or more electronic components. The processing logic may associate a global identifier with each of the independent discretized component models. The independent discretized component model for the one or more electronic components may be a one-dimensional or two-dimensional representation of the one or more electronic components.

At block 308, the processing logic generates, based on the printed circuit board design, a final finite element model by combining the first finite element model with the independent discretized component model for each of the one or more electronic components. In one embodiment, to combine the first finite element model with the independent discretized component model for each of the electronic components the processing logic may generate one or more component finite element embedded in the first finite element model and map the independent discretized component models to the component finite elements embedded in the first finite element model. In one embodiment, the features and properties of the independent discretized component models may be copied to the corresponding component finite elements models. In another embodiment, the independent discretized component models may be mapped to the component finite elements using a mapping table or other data structure to associate each independent discretized component model with the corresponding component finite elements. The processing logic may generate the one or more component finite elements embedded in the first finite element model by determining, based on the design of the printed circuit board, a collision of the independent discretized component models and the finite elements of the first finite element model of the dielectric board.

The processing logic may further simulate, based on the final finite element model, operation of the printed circuit board design and identify, based on the simulation, thermal stresses associated with operation of the printed circuit board design.

Figure 4A:
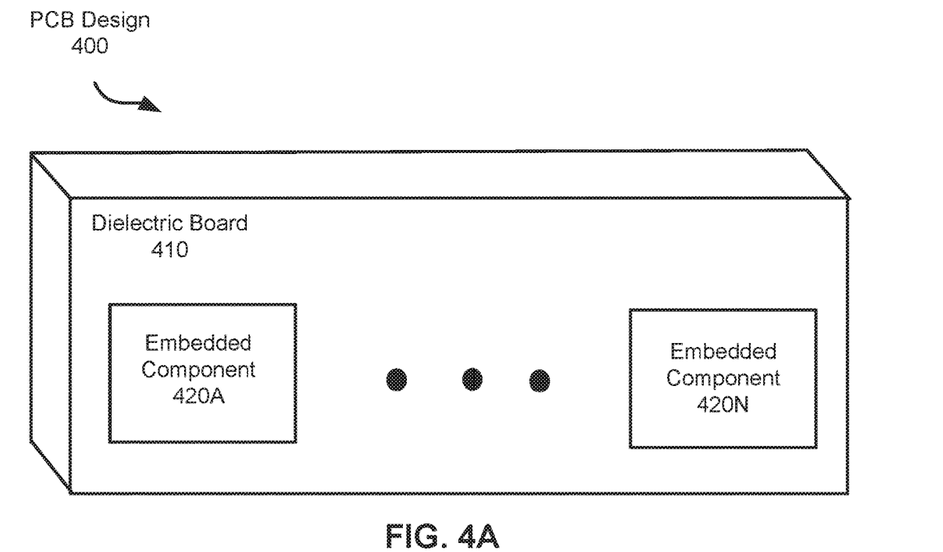
FIG. 4A depicts a printed circuit board (PCB) with embedded components according to one embodiment.

FIG. 4A depicts a printed circuit board (PCB) design with embedded components according to one embodiment. In one embodiment, the printed circuit board design 400 includes a dielectric board 410 (e.g., the board) and one or more embedded components 420A-N. The dielectric board 410 may be made of an insulating material and/or a dielectric material such as silicon. The dielectric board 410 may include one or more circuit board layers, each being etched, or printed individually at each layer to build a three-dimensional circuit board with components embedded at each layer. Alternatively, the dielectric board 410 may be a homogenous substrate mass. The embedded components 420A-N may be embedded within and in between the layers of the dielectric board 410. The embedded components 420A-N may include traces, wires, vias connecting layers, electronic devices, integrated circuits, and any other electronic component. It should be noted that the depiction of the embedded components 420A-N is an abstraction of the components embedded in the dielectric board 410. The embedded components 420A-N may be of any size and form, may be physically located anywhere in the dielectric board, and may be connected in any number of ways. Furthermore, there may be any number of embedded components 420A-N included in the PCB design 400.

Figure 4B:
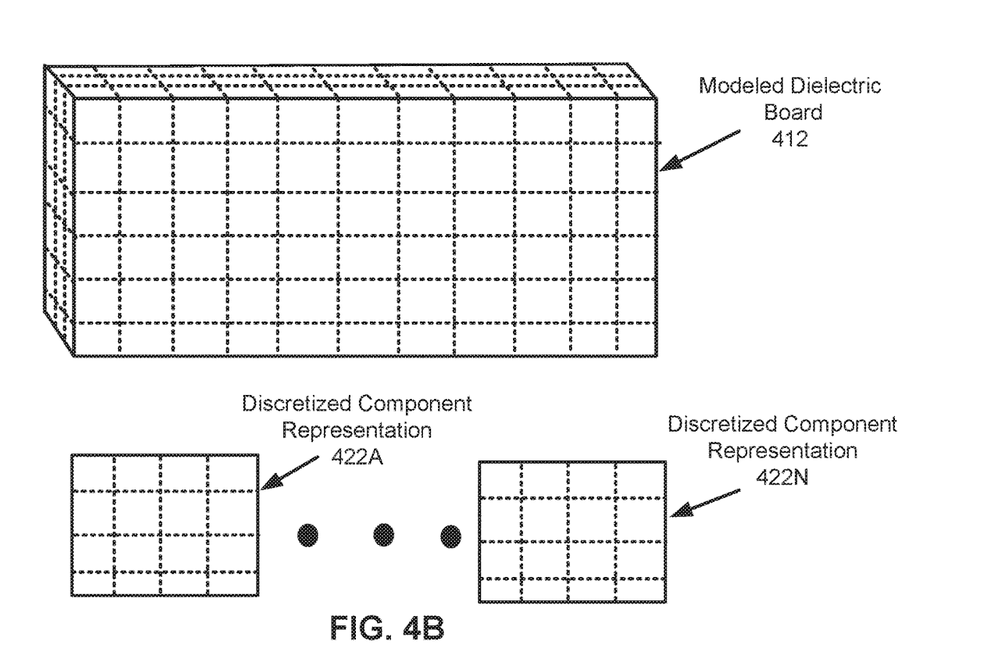
FIG. 4B depicts independent modeling of the dielectric board and the embedded components according to one embodiment.

FIG. 4B depicts independent modeling of the dielectric board and the embedded components according to one embodiment. In one embodiment, as depicted the modeled dielectric board 412 may consist of a set of finite elements produced my meshing the dielectric board 410. The set of finite elements of the modeled dielectric board 412 may be generated based on the geometry of the dielectric board 410. In one embodiment, the level of mesh refinement and computational costs may be selected and adjusted by a user. Therefore, a high quality mesh can be created easily without including the embedded components 420A-N in the mesh of the modeled dielectric board 412. In one embodiment, no interior surfaces are modeled and no contact or interface elements are included in the mesh. Once the mesh of finite elements is generated, the mesh of the modeled dielectric board 412 may be updated with material properties of the board and the thermal loads (or other physical loads) of the board. In one example, the physical properties may include non-linear behaviors such as field dependent (e.g., temperature and displacements) and loading history dependent properties.

The discretized component representations 422A-N may each be an individually modeled embedded component 420A-N from the PCB design 400. The discretized component representations 422A-N may include the geometries, loads, and other physical properties for each of the embedded electronic components.

In one example, the physical properties may include non-linear behaviors such field dependent (e.g., temperature and displacements) and loading history dependent properties. Each discretized component representation 422A-N may be associated with a global identifier, either individually or as groups. The discretized component representations 422A-N may not include an interface with the board and limits are not imposed on the component geometries or quantities.

Figure 4C:
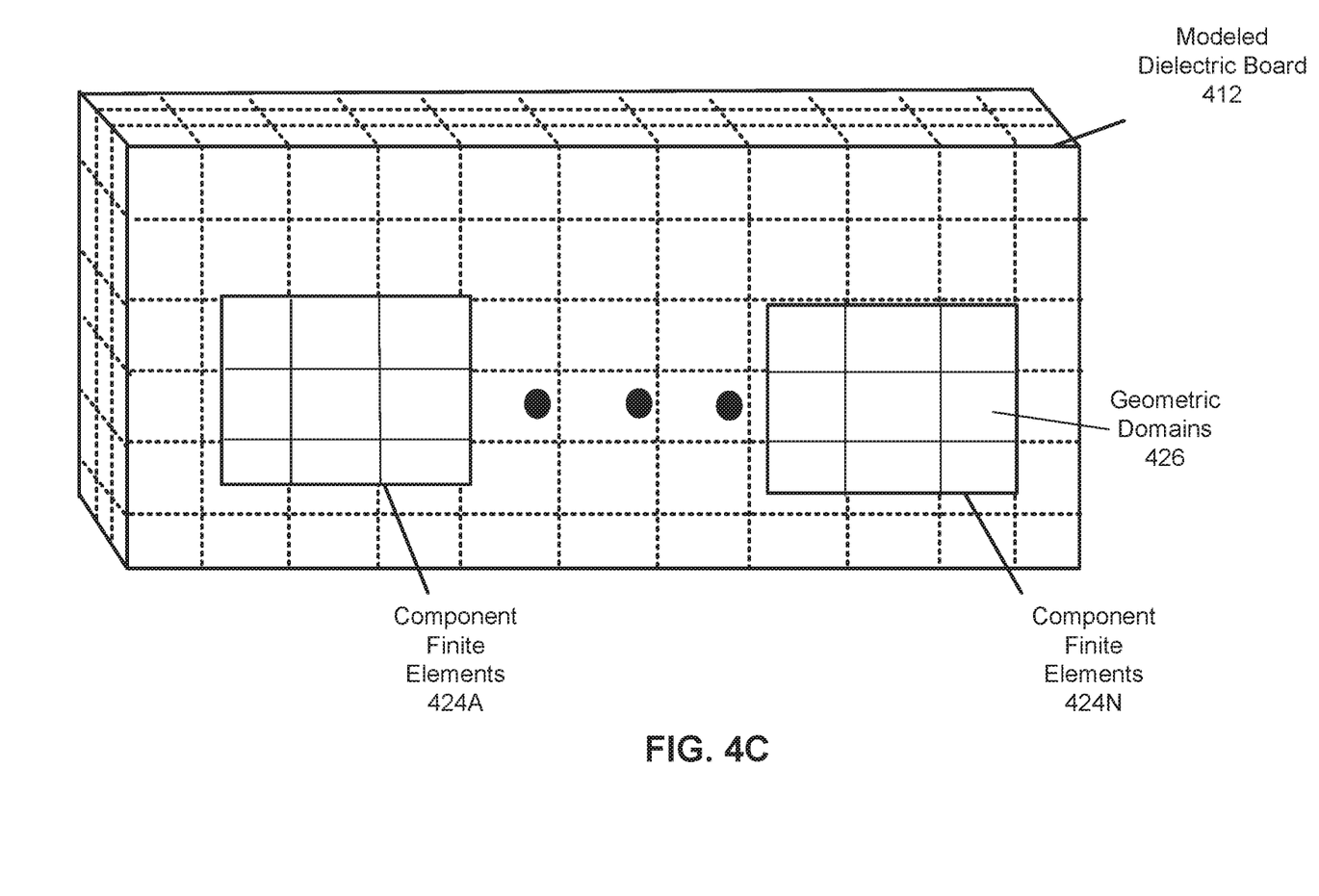
FIG. 4C depicts a complete model of the printed circuit board after combining the independent models of the dielectric board and the embedded components according to one embodiment.

FIG. 4C depicts a complete model of the printed circuit board after combining the modeled dielectric board 412 and the discretized component representations 422A-N according to one embodiment. The discretized component representations 422A-N may be combined with the modeled dielectric board 412 by generating component finite elements 424A-N embedded in the modeled dielectric board 412 mesh and mapping the discretized component representations 422A-N to component finite elements 424A-N in the final model. Thus, the material properties and loads of the discretized component representations 422A-N are mapped to the component finite elements 424A-N embedded in the mesh of the modeled dielectric board 412. Additionally, the global identifiers assigned to the discretized component representations 422A-N, as described in FIG. 4B, may be mapped to the corresponding component finite elements 424A-N. Therefore, components and groups of components can easily be identified and inspected during and after simulation. The global identifiers may also provide for intuitive model visualization.

The component finite elements 424A-N may be special purpose finite elements of the mesh to represent embedded components 420A-N and component interfaces with the dielectric board 410. In one example, generating the component finite elements 424A-N includes creating hierarchical trees of oriented bounding boxes (OBBs) for both the finite elements of the modeled dielectric board 412 and the discretized component representations 422A-N. An OBB tree may include several OBBs which each represent a component or a finite element of the board. Each OBB may project a three-dimensional shape. A collision may be detected when the three-dimensional shapes (OBBs) overlap. To map the discretized component representations 422A-N to the component finite elements 424A-N, the mesh generator performs collisions/intersection operations with the OBB trees (as described above) for the modeled dielectric board 412 and the discretized component representations 422A-N. The mesh generator then performs local meshing to create the component finite elements 424A-N and maps the material properties, loads, global identifiers and other model data from the discretized component representations 422A-N to the component finite elements 424A-N. Inverse parametric mapping may be used to set up the interaction between the component finite elements 424A-N and the modeled dielectric board 412.

The discretized component representations 422A-N may be divided into smaller geometric domains 426 so that each of the domains corresponds directly to a finite element of the matrix of finite elements of the modeled dielectric board 412. Local discretization may be performed with these smaller component domains to generate embedded component finite elements 424A-N in the modeled dielectric board and map the properties of the discretized representations to the corresponding embedded component finite elements. Mapping of the discretized representations to the embedded components may include generating a mapping table or other association between the discretized representations and the component finite elements.

The component finite elements 424A-N may be geometrically idealized from three-dimensional component to surfaces and/or curves to reduce the size of the model. To combine the discretized component representations 422A-N with the mesh of finite elements of the modeled dielectric board 412, surface interactions and collisions are identified based on the PCB design 400. In one example, reverse parametric mapping may be used to embed the component finite elements 424A-N in the mesh of finite elements of the modeled dielectric board 412. Reverse parametric mapping may include finding the normalized locations of each component finite element with respect to the corresponding finite element of the dielectric board, and applying system constraints based on these normalized locations to secure the connection between the component finite element and the board finite element.

Figure 5:
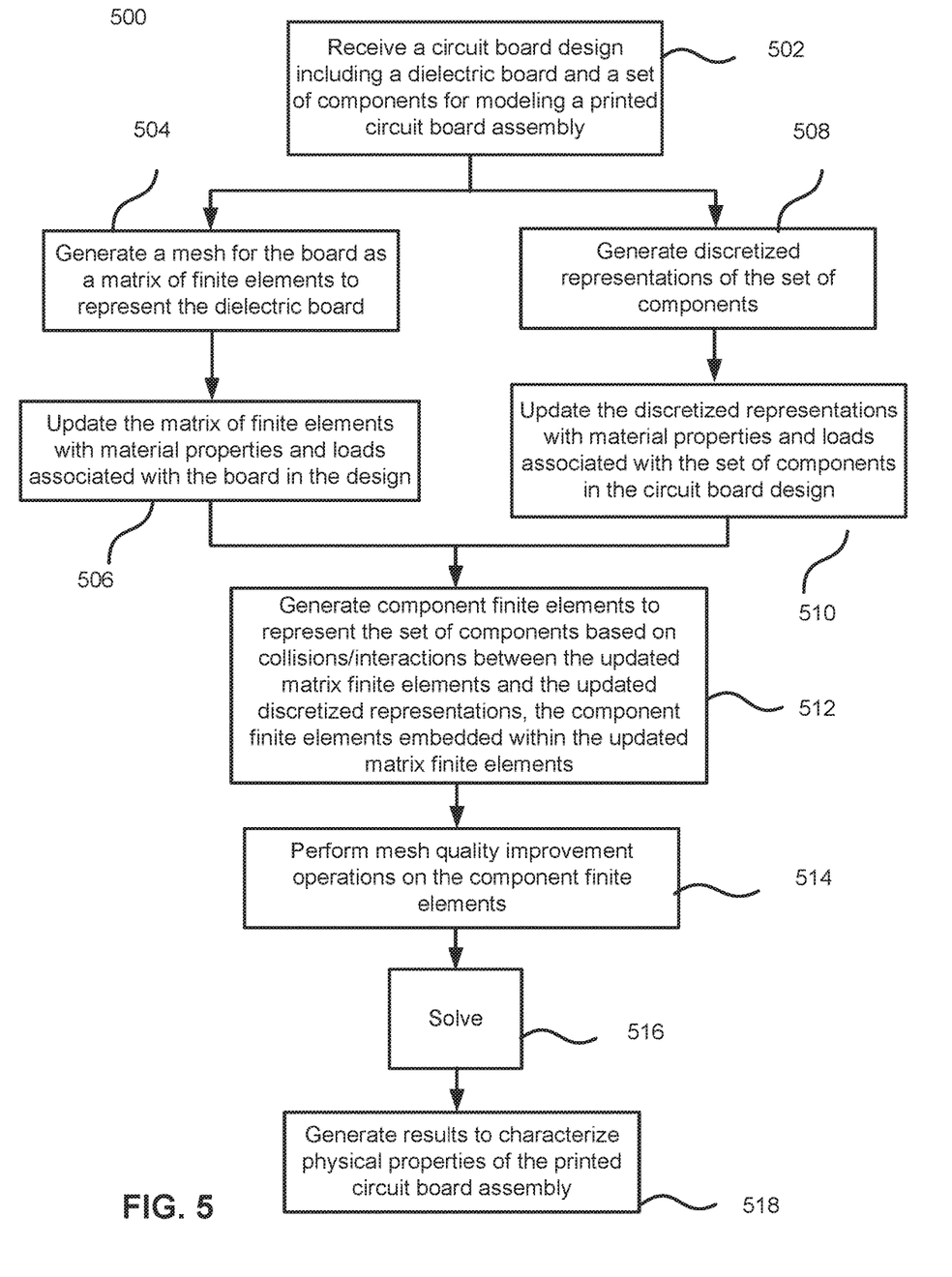
FIG. 5 depicts a flow diagram illustrating an example method for modeling and simulating a printed circuit board design according to one embodiment.

FIG. 5 depicts a flow diagram illustrating an example method for modeling and simulating a printed circuit board design according to one embodiment. Process 500 may be performed by processing logic which may include software, hardware, or a combination thereof. For example, process 500 can be performed by mesh generator 256 of FIGS. 2A-2B. Referring to FIG. 5, at block 502, processing logic receives a circuit board design and a set of components for modeling a printed circuit board assembly. The circuit board design may be a computer generated model of the circuit board design. In one embodiment, a user may generate the circuit board design using computer assisted design (CAD) software.

At block 504, the processing logic generates a mesh of the circuit board as a matrix of finite elements to represent the dielectric board. The circuit board design may include a dielectric board component (e.g., a silicon board). The dielectric board may include multiple board layers each with one or more embedded electronic components.

At block 506, processing logic updates the matrix of finite elements with material properties and loads associated with the board in the circuit board design. The finite elements of the matrix of finite elements may each represent a physical portion of the dielectric board. Each finite element may be updated with the physical properties of the physical portion represented by the finite element. Additionally, the finite elements may be updated with boundary conditions and loads (e.g., electrical, thermal, or other loads) to represent operating conditions of the circuit board.

At block 508, processing logic generates discretized representations of the set of components. The set of components may include electrical components such as wires, traces, vias, electronic devices, integrated circuits, etc. The discretized representations of the components may be generated based on the geometry of the components. The discretized representations may be separate from the matrix of finite elements of the dielectric board. Because the components may be modeled independently of the dielectric board, component interfaces with the board may not be enforced or included in the discretized representations, thus reducing the model size. Each of the discretized representations or groups of discretized representations may include a global identifier.

At block 510, processing logic updates the discretized representations with material properties and loads associated with the set of components in the circuit board design. The updated discretized representations may further include field dependent and load history dependent characteristics of the embedded components.

At block 512, processing logic generates component finite elements to represent the set of components based on collisions/interactions between the updated matrix of finite elements and the updated discretized representations. The component finite elements may be embedded within the updated matrix of finite elements. Each of the discretized representation of the embedded components may be mapped to a component finite element. A component finite element may be one or more special purpose finite elements generated to represent the embedded components for a circuit board simulation. Components included in the circuit board design may have a small cross section or thickness in comparison to their overall dimensions. In one embodiment, the component finite elements may represent the components in one dimension or two dimensions (e.g., via curves and surfaces). Representing the components in reduced dimensions may significantly reduce the size of the finite element model. In one embodiment, the global identifiers of the discretized representations may be assigned to the corresponding component finite elements.

At block 514, processing logic performs mesh quality improvement operations on the component finite elements. For example, groupings of components may be combined or homogenized and duplicate components may be removed. At block 516, processing logic solves the finite element model. Solving the finite element model may include computational solutions to differential equations based on the finite elements and the associated boundary conditions and physical properties. At block 518, processing logic generates results to characterize physical properties of the printed circuit board assembly. The solutions from block 516 may be solutions of a time series (e.g., solutions over a period of time) describing the electrical and thermal stresses for the board over a period of time.

The methods and systems described herein may be implemented using any suitable processing system with any suitable combination of hardware, software and/or firmware, such as described below with reference to the non-limiting examples of FIGS. 6A-6C.

Figures 6A, 6B:
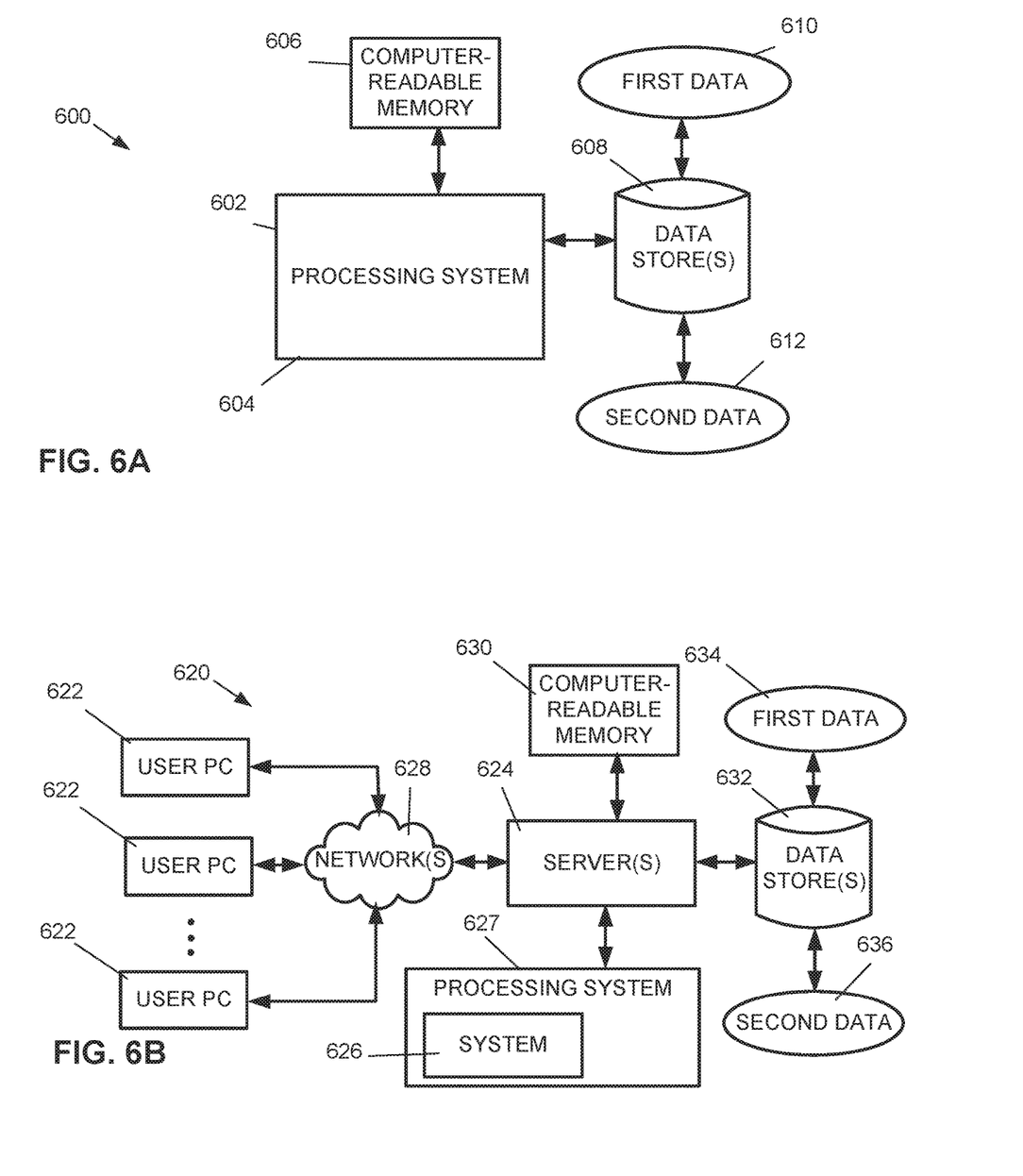
FIGS. 6A-6C depict example systems for use in implementing a system according to one embodiment.
Figure 6C:
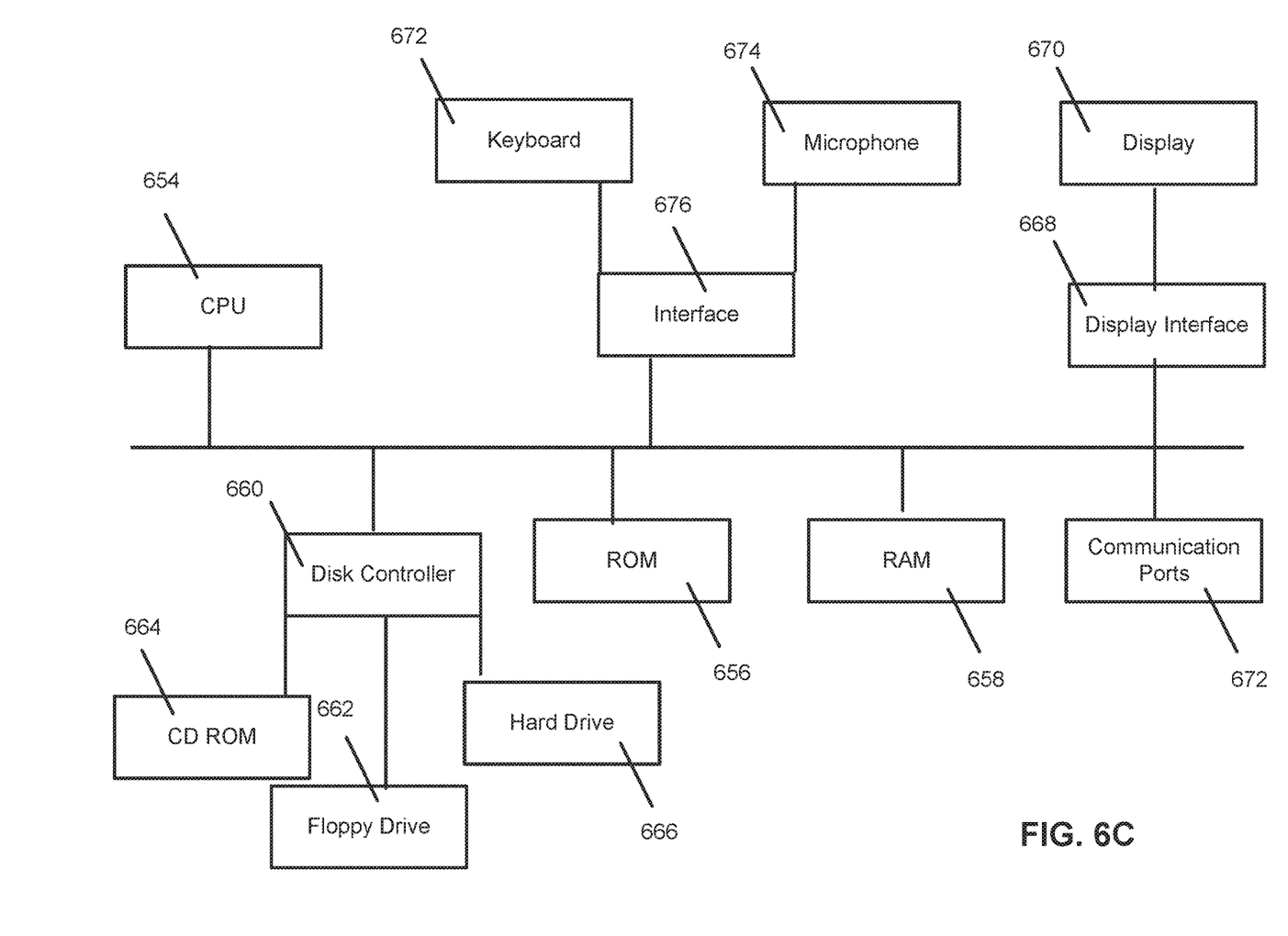

FIGS. 6A-6C depict example systems for use in implementing a system. For example, FIG. 6A depicts an exemplary system 600 that includes a standalone computer architecture where a processing system 602 (e.g., one or more computer processors) includes a system 604 being executed on it. The processing system 602 has access to a non-transitory computer-readable memory 606 in addition to one or more data stores 608. The one or more data stores 608 may contain first data 610 as well as second data 612.

FIG. 6B depicts a system 620 that includes a client server architecture. One or more user PCs 622 accesses one or more servers 624 running a system 626 on a processing system 627 via one or more networks 628. The one or more servers 624 may access a non-transitory computer readable memory 630 as well as one or more data stores 632. The one or more data stores 632 may contain first data 634 as well as second data 636.

FIG. 6C shows a block diagram of exemplary hardware for a standalone computer architecture 650, such as the architecture depicted in FIG. 16A, that may be used to contain and/or implement the program instructions of system embodiments of the present disclosure. A bus 652 may serve as the information highway interconnecting the other illustrated components of the hardware. A processing system 654 labeled CPU (central processing unit) (e.g., one or more computer processors), may perform calculations and logic operations required to execute a program. A non-transitory computer-readable storage medium, such as read only memory (ROM) 656 and random access memory (RAM) 658, may be in communication with the processing system 654 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 656 to be displayed on a display 670 in audio, graphic, or alphanumeric format. Communication with external devices may optionally occur using various communication ports 672.

In addition to the standard computer-type components, the hardware may also include data input devices, such as a keyboard 672, or other input device 674, such as a microphone, remote control, pointer, mouse, touchscreen and/or joystick.

This written description describes exemplary embodiments of the disclosure, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A non-transitory machine readable medium storing executable instructions which when executed by a data processing system cause the data processing system to perform a machine implemented method, the method comprising:
   receiving a printed circuit board design for an electronic component embedded in a dielectric board;
   generating a first finite element model to represent the dielectric board independent of the electronic component;
   generating a second finite element model for the electronic component separate from the first finite element model of the dielectric board;
   identifying surface interactions between the dielectric board and the electronic component in the printed circuit board design;
   dividing the second finite element model into a plurality of geometric domains based on the surface interactions, each geometric domain corresponding to a finite element of the first finite element model of the dielectric board; and
   combining the first finite element model with the second finite element model to obtain a final finite element model for the printed circuit board design by mapping each geometric domain of the second finite element into a corresponding finite element of the first finite element model based on the surface interactions between the dielectric board and the electronic component in the printed circuit board design.

2. The medium as in claim 1, wherein combining the first finite element model with the second finite element model comprises:
   generating one or more component finite elements embedded in the first finite element model; and
   mapping properties of the second finite element model to the component finite elements embedded in the first finite element model.

3. The medium as in claim 2, wherein generating one or more component finite elements embedded in the first finite element model comprises:

determining, based on the printed circuit board design, a collision of the second finite element model and the finite elements of the first finite element model of the dielectric board.

4. The medium of claim 1, wherein the second finite element model comprises a first set of physical properties associated with the electronic component.

5. The medium of claim 4, wherein a second set of physical properties is associated with each of the finite elements of the first finite element model of the dielectric board.

6. The medium as in claim 5, wherein the first set and the second set of physical properties comprise one or more non-linear properties of a corresponding finite element.

7. The medium as in claim 1, further comprising:
   simulating, based on the final finite element model, operation of the printed circuit board design; and
   identifying, based on the simulation, thermal stresses associated with operation of the printed circuit board design.

8. The medium as in claim 1, wherein a global identifier is associated with the second finite element model.

9. The medium as in claim 1, wherein the first finite element model is generated based on a geometry of the dielectric board.

10. The medium as in claim 1, wherein the second finite element model of the electronic component comprises a one-dimensional or two-dimensional representation of the electronic component.

11. A machine implemented method, the method comprising:
    receiving a printed circuit board design for an electronic component embedded in a dielectric board;
    generating a first finite element model to represent the dielectric board independent of the electronic component;
    generating a second finite element model for the electronic component separate from the first finite element model of the dielectric board;
    identifying surface interactions between the dielectric board and the electronic component in the printed circuit board design;
    dividing the second finite element model into a plurality of geometric domains based on the surface interactions, each geometric domain corresponding to a finite element of the first finite element model of the dielectric board; and
    combining the first finite element model with the second finite element model to obtain a final finite element model for the printed circuit board design by mapping each geometric domain of the second finite element into a corresponding finite element of the first finite element model based on the surface interactions between the dielectric board and the electronic component in the printed circuit board design.

12. The method as in claim 11, wherein combining the first finite element model with the second finite element model for the electronic component comprises:
    generating one or more component finite elements embedded in the first finite element model; and
    mapping properties of the second finite element model to the component finite elements embedded in the first finite element model.

13. The method as in claim 12, wherein generating one or more component finite elements embedded in the first finite element model comprises:
    determining, based on the printed circuit board design, a collision of the second finite element model and the finite elements of the first finite element model of the dielectric board.

14. The method of claim 11, wherein the second finite element model comprises a first set of physical properties associated with the electronic component.

15. The method of claim 14, wherein a second set of physical properties is associated with each of the finite elements of the first finite element model of the dielectric board.

16. The method as in claim 15, wherein the first set and the second set of physical properties comprise one or more non-linear properties of a corresponding finite element.

17. The method as in claim 11, further comprising:
    simulating, based on the final finite element model, operation of the printed circuit board design; and
    identifying, based on the simulation, thermal stresses associated with operation of the printed circuit board design.

18. The method as in claim 11, wherein a global identifier is associated with the second finite element model.

19. The method as in claim 11, wherein the first finite element model is generated based on a geometry of the dielectric board.

20. The method as in claim 11, wherein the second finite element model for the electronic component comprises a one-dimensional or two-dimensional representation of the electronic component.

\* \* \* \* \*